(12) United States Patent
Chow et al.

(10) Patent No.: US 9,849,802 B2
(45) Date of Patent: Dec. 26, 2017

(54) METHOD AND APPARATUS FOR ANALYZING DATA RELATED TO VEHICLE RANGE ESTIMATION

(71) Applicants: Samsung Electronics Co., Ltd., Suwon-si (KR); North Carolina State University, Raleigh, NC (US)

(72) Inventors: Mo-Yuen Chow, Raleigh, NC (US); Paul Barom Jeon, Seoul (KR); Habiballah Rahimi Eichi, Raleigh, NC (US); Taejung Yeo, Yongin-si (KR)

(73) Assignees: Samsung Electronics Co., Ltd., Suwon-si (KR); North Carolina State University, Raleigh, NC (US)

( * ) Notice: Subject to any disclaimer, the term of this patent is extended or adjusted under 35 U.S.C. 154(b) by 0 days.

(21) Appl. No.: 14/924,566

(22) Filed: Oct. 27, 2015

(65) Prior Publication Data

US 2016/0114698 A1    Apr. 28, 2016

Related U.S. Application Data

(60) Provisional application No. 62/069,424, filed on Oct. 28, 2014.

(30) Foreign Application Priority Data

Mar. 9, 2015    (KR) .................. 10-2015-0032722

(51) Int. Cl.
*B60L 11/18*    (2006.01)
*B60L 3/12*    (2006.01)

(52) U.S. Cl.
CPC ............ *B60L 11/1861* (2013.01); *B60L 3/12* (2013.01); *Y02T 10/7005* (2013.01)

(58) Field of Classification Search
CPC ............................ B60L 11/1861; B60L 3/12
See application file for complete search history.

(56) References Cited

U.S. PATENT DOCUMENTS 6,646,419 B1    11/2003    Ying
8,433,455 B2    4/2013    Siy et al.
(Continued)

FOREIGN PATENT DOCUMENTS

JP    2013-34323 A    2/2013
KR    10-2009-0093174 A    9/2009
(Continued)

OTHER PUBLICATIONS

H. Rahimi-Eichi et al., "Big-Data Framework for Electric Vehicle Range Estimation," *Proceedings of the 40th Annual Conference of the IEEE Industrial Electronics Society (IECON 2014)*, 2014, pp. 5628-5634, conference held Oct. 29, 2014-Nov. 1, 2014, Dallas, TX, paper presented on Oct. 31, 2014.

*Primary Examiner* — Michael D Lang
(74) *Attorney, Agent, or Firm* — NSIP Law

(57) ABSTRACT

A method of analyzing data related to a driving range estimation of a vehicle includes collecting attribute data related to the driving range estimation of the vehicle, analyzing a correlation between the attribute data and a driving range of the vehicle, generating a vehicle driving range estimation model based on the analyzed correlation, and analyzing a sensitivity between the vehicle driving range estimation model and the attribute data.

25 Claims, 5 Drawing Sheets

(56) References Cited

U.S. PATENT DOCUMENTS

| | | | |
|---|---|---|---|
| 2011/0087390 A1* | 4/2011 | Pandit | B60K 1/00 701/22 |
| 2011/0224868 A1* | 9/2011 | Collings, III | B60L 11/1857 701/33.4 |
| 2012/0109408 A1 | 5/2012 | Siy et al. | |

FOREIGN PATENT DOCUMENTS

| | | |
|---|---|---|
| KR | 10-2013-0051132 A | 5/2013 |
| KR | 10-2013-0088874 A | 8/2013 |
| KR | 10-2014-0046295 A | 4/2014 |
| KR | 10-2014-0068515 A | 6/2014 |
| WO | WO 2012/079954 A2 | 6/2012 |

* cited by examiner

METHOD AND APPARATUS FOR ANALYZING DATA RELATED TO VEHICLE RANGE ESTIMATION

CROSS-REFERENCE TO RELATED APPLICATION(S)

This application claims the benefit under 35 USC 119(e) of U.S. Provisional Application No. 62/069,424 filed on Oct. 28, 2014, in the U.S. Patent and Trademark Office, and claims the benefit under 35 USC 119(a) of Korean Patent Application No. 10-2015-0032722 filed on Mar. 9, 2015, in the Korean Intellectual Property Office, the entire disclosures of which are incorporated herein by reference for all purposes.

BACKGROUND

1. Field

This application relates to a method and an apparatus for analyzing data related to a driving range estimation of a vehicle.

2. Description of Related Art

Industry research has revealed that the anxiety felt by many drivers about the remaining driving range of an electric vehicle (EV) before the battery runs down and needs to be charged is a major contributing factor to a low adoption rate of EVs. The anxiety generally occurs since current technology cannot accurately estimate the remaining driving range of an EV.

EV remaining driving range estimation technologies according to the related art mainly rely on the limited collection of data. While some methods put more emphasis on an electrochemical behavior of a battery, there are other methods that focus on identifying different driving patterns. Moreover, some other methods consider more global positioning system (GPS)-based and manufacture-provided data with a simplified EV power train model. In addition, some other methods consider up to nine factors to estimate the driving range of an EV. However, a sensitivity and a reliability of a range estimation algorithm change under different environmental and operational conditions. Accordingly, a structure capable of processing all data related to the driving range estimation may be considered to accurately estimate the driving range of an EV.

In recent times, with an increase in a variety of sensors, wideband communication systems, and cheap memories to observe, measure, and store real-time data related to the driving range of an EV in a vehicle or a cloud, an amount of data collected in the EV is fast increasing. Such large amounts of data may have different levels of accuracy, resolutions, and relevance in unstructured ways. Big data techniques have been emerging to address huge, diverse, and unstructured data to significantly enhance the performance of an entire system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of analyzing data related to a driving range estimation of a vehicle includes collecting attribute data related to the driving range estimation of the vehicle; analyzing a correlation between the attribute data and a driving range of the vehicle; generating a vehicle driving range estimation model based on the analyzed correlation; and analyzing a sensitivity between the vehicle driving range estimation model and the attribute data.

The analyzing of the correlation may include classifying the attribute data into a predefined category based on statistical data in response to the attribute data being non-deterministic data that varies as the vehicle is driven; and analyzing a correlation between the category and the driving range of the vehicle.

The attribute data may include any one or any combination of any two or more of standard data that is deterministic data that does not vary as the vehicle is driven, historical data based on a previous probabilistic behavior of a driver, and real-time data related to current driving data of the vehicle.

The method may further include feeding back the analyzed sensitivity; and the collecting of the attribute data may include adjusting a frequency and a resolution for collecting the attribute data based on the fed-back sensitivity.

The generating of the vehicle driving range estimation model may include modifying the vehicle driving range estimation model based on the fed-back sensitivity.

The generating of the vehicle driving range estimation model may include generating the vehicle driving range estimation model by applying deterministic data that does not vary as the vehicle is driven as a coefficient of the vehicle driving range estimation model; and applying an influence of non-deterministic data on the vehicle driving range estimation model, the non-deterministic data varying as the vehicle is driven.

The deterministic data may include any one or any combination of any two or more of a drag coefficient of the vehicle, a front area of the vehicle, and battery charge data.

The non-deterministic data may include any one or any combination of any two or more of a speed of the vehicle, an acceleration of the vehicle, weather data, and a driving route.

The analyzing of the sensitivity may include calculating an estimation error occurring in estimating the driving range of the vehicle in response to the attribute data being insufficient for the vehicle driving range estimation model.

The method may further include generating a power profile of the vehicle corresponding to route data using the vehicle driving range estimation model.

The method may further include estimating remaining battery charge data by applying the power profile to a battery model of the vehicle.

In another general aspect, an apparatus for analyzing data related to a driving range estimation of a vehicle includes a data collector configured to collect attribute data related to the driving range estimation of the vehicle; a correlation analyzer configured to analyze a correlation between the attribute data and a driving range of the vehicle; a model generator configured to generate a vehicle driving range estimation model based on the analyzed correlation; and a sensitivity analyzer configured to analyze a sensitivity between the vehicle driving range estimation model and the attribute data.

The correlation analyzer may be further configured to classify the attribute data into a predefined category based on statistical data in response to the attribute data being non-deterministic data that varies as the vehicle is driven, and analyze a correlation between the category and the driving range of the vehicle.

The attribute data may include any one or any combination of any two or more of standard data that is deterministic data that does not vary as the vehicle is driven, historical data based on a previous probabilistic behavior of a driver, and real-time data related to current driving data of the vehicle.

The sensitivity analyzer may be further configured to feed back the analyzed sensitivity; and the data collector may be further configured to adjust a frequency and a resolution for collecting the attribute data based on the fed-back sensitivity.

The model generator may be further configured to modify the vehicle driving range estimation model based on the fed-back sensitivity.

The model generator may be further configured to generate the vehicle driving range estimation model by applying deterministic data that does not vary as the vehicle is driven as a coefficient of the vehicle driving range estimation model, and apply an influence of non-deterministic data on the vehicle driving range estimation model, the non-deterministic data varying as the vehicle is driven.

The sensitivity analyzer may be further configured to calculate an estimation error occurring in estimating the driving range of the vehicle in response to the attribute data being insufficient for the vehicle driving range estimation model.

The apparatus may further include a power profile generator configured to generate a power profile of the vehicle corresponding to route data using the vehicle driving range estimation model.

The apparatus may further include a battery simulator configured to estimate remaining battery charge data by applying the power profile to a battery model of the vehicle.

In another general aspect, an apparatus for estimating a driving range of a vehicle includes a model generator configured to generate a vehicle driving range estimation model based on attribute data affecting the driving range of the vehicle; a sensitivity analyzer configured to analyze a sensitivity between the vehicle driving range estimation model and the attribute data, and modify the vehicle driving range estimation model based on the sensitivity; and a battery simulator configured to estimate a remaining charge of a battery of the vehicle based on the vehicle driving range estimation model and the attribute data, the remaining charge being indicative of the driving range of the vehicle.

The sensitivity analyzer may be further configured to modify the vehicle driving range estimation model to have a relatively greater sensitivity to attribute data having a relatively greater effect on the driving range of the vehicle among all of the attribute data, and to have a relatively lesser sensitivity to attribute data have a relatively lesser effect on the driving range of the vehicle among all of the attribute data.

The apparatus may further include a correlation analyzer configured to analyze a correlation between the attribute data and the driving range of the vehicle; and the model generator may be further configured to generate the vehicle driving range estimation model based on the analyzed correlation.

The apparatus may further include a power profile generator configured to generate a power profile of the vehicle corresponding to a route over which the vehicle is being driven based on the vehicle driving range estimation model and the attribute data.

The attribute data may include battery data of the battery; and the battery simulator may be further configured to estimate the remaining charge of the battery based on the power profile, the battery data, and a battery model of the battery.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to that set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only, and is not intended to limit the scope of the disclosure. As used herein, the singular forms "a," "an," and "the" are intended to include the plural forms as well, unless the context clearly indicates otherwise. It will be further understood that the terms "include," "comprise," and "have," when used in this application, specify the presence of stated features, numbers, operations, elements, components, or combinations thereof, but do not preclude the presence or addition of one or more other features, numbers, operations, elements, components, or combinations thereof.

Unless otherwise defined, all terms, including technical and scientific terms, used herein have the same meaning as commonly understood by one of ordinary skill in the art to which this disclosure pertains. It will be further understood that terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
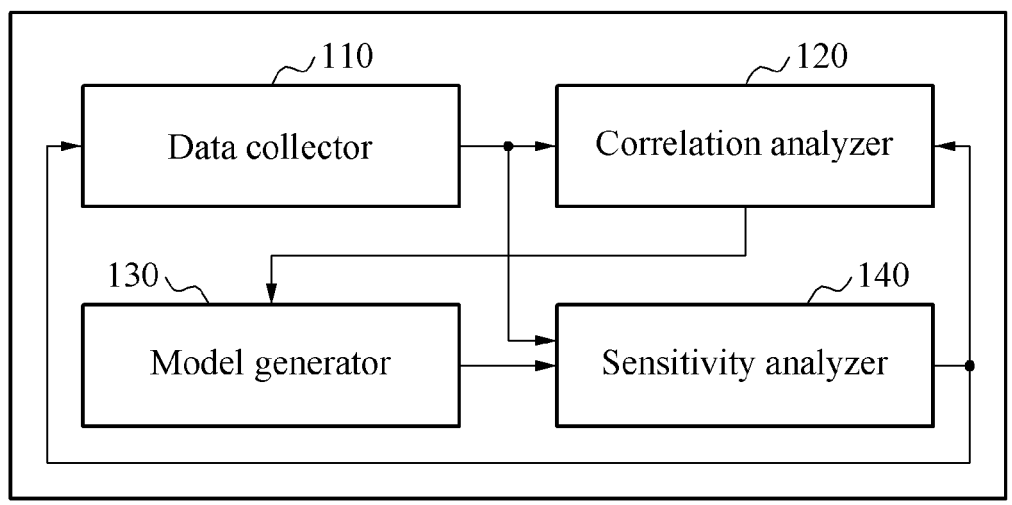
FIG. 1 is a block diagram illustrating an example of an apparatus for analyzing data related to a driving range estimation of a vehicle.

FIG. 1 illustrates an example of an apparatus (hereinafter, a data analysis apparatus) for analyzing data related to a driving range estimation of a vehicle.

Referring to FIG. 1, the data analysis apparatus 100 includes a data collector 110, a correlation analyzer 120, a model generator 130, and a sensitivity analyzer 140.

The data collector 110 collects attribute data related to the driving range estimation of the vehicle.

For example, the data collector 110 collects topographical data through a web map application such as Google Maps. Additionally, the data collector 110 collects topographical data from a navigation program and a navigation device. The geographical data includes, for example, a topographical elevation and a road state of a driving route.

Also, the data collector 110 collects weather data through a weather website. The weather data includes weather data, for example, snow, rain, and fog, related to the driving range estimation.

Also, the data collector 110 collects vehicle data from an electric vehicle (EV) manufacturer. The vehicle data includes, for example, a fuel efficiency, a drag coefficient, and a front area of a vehicle. The term "vehicle" used herein includes, for example, an electric vehicle (EV), and may be interchangeably used with "EV" throughout this application.

Also, the data collector 110 collects battery data from a battery manufacturer. The battery data includes, for example, a battery capacity and a battery output.

In one example, attribute data includes any one or any combination of any two or more of standard data that is deterministic data that does not vary as the vehicle is driven, historical data based on a previous probabilistic behavior of a driver, and real-time data related to current driving data of the vehicle.

When a large scale of distributed computing is required, the data collector 110 may forward tasks to a big data software framework such as the Apache Hadoop framework.

The correlation analyzer 120 analyzes a correlation between the collected attribute data and the driving range of the vehicle. That is, the correlation analyzer 120 determines whether the collected attribute data affects the driving range of the vehicle.

The correlation analyzer 120 determines the correlation between the collected attribute data and the driving range of the vehicle. For example, the correlation analyzer 120 determines the correlation between the collected attribute data and the driving range of the vehicle using a cosine correlation.

In response to the attribute data being non-deterministic data that varies as the vehicle is driven, the correlation analyzer 120 classifies the attribute data into a predefined category based on statistical data and analyzes a correlation between the category and the driving range of the vehicle.

When analyzing the correlation, the correlation analyzer 120 may utilize a big data software framework, for example, the Apache Hadoop framework.

The model generator 130 generates a vehicle driving range estimation model based on the analyzed correlation. The vehicle driving range estimation model includes a model for estimating a driving range, for example, a distance that the vehicle may drive without the battery being recharged, based on the attribute data.

In one example, the model generator 130 generates the vehicle driving range estimation model by applying deterministic data that does not vary as the vehicle is driven as a coefficient of the vehicle driving range estimation model, and applies an influence of non-deterministic data on the vehicle driving range estimation model. The non-deterministic data varies as the vehicle is driven.

The sensitivity analyzer 140 analyzes a sensitivity between the vehicle driving range estimation model and the attribute data. The sensitivity indicates a level of influence of the attribute data on the driving range estimation results through the vehicle driving range estimation model.

In response to the attribute data being insufficient for the vehicle driving range estimation model, the sensitivity analyzer 140 calculates an estimation error occurring in estimating the driving range of the vehicle.

The sensitivity analyzer 140 provides sensitivity analysis results associated with updating of data. That is, when historical data is used instead of updated data, the sensitivity analyzer 140 provides results of analyzing the estimation error that occurs in estimating the driving range of the vehicle.

When calculating the sensitivity between the vehicle driving range estimation model and the attribute data, the sensitivity analyzer 140 may utilize a big data software framework, for example, the Apache Hadoop framework.

The sensitivity analyzer 140 feeds back the analyzed sensitivity.

The sensitivity analyzer 140 feeds back the calculated sensitivity to the correlation analyzer 120, and the correlation analyzer 120 modifies the vehicle driving range estimation model based on the fed-back sensitivity. The correlation analyzer 120 may modify the complexity of the vehicle driving range estimation model based on the fed-back sensitivity. For example, if the sensitivity analyzer 140 determines that the vehicle driving range estimation model is not very sensitive to one type of attribute data, the correlation analyzer 120 may reduce the complexity of the vehicle driving range estimation model by reducing or eliminating the influence of that type of attribute data on the vehicle driving range estimation model. Alternatively, if the sensitivity analyzer 140 determines that the vehicle driving range estimation model is very sensitive to another type of attribute data, the correlation analyzer 120 may increase the complexity of the vehicle driving range estimation model by adding or increasing the influence of that type of attribute data on the vehicle driving range estimation model.

Also, the sensitivity analyzer 140 feeds back the calculated sensitivity to the data collector 110, and the data collector 110 adjusts a frequency and a resolution for collecting attribute data based on the fed-back sensitivity. The frequency for collecting attribute data indicates a sampling rate at which attribute data is collected.

When a wide range of data mining or an enormous amount of computing capacity is required for collecting and analyzing the attribute data, the sensitivity analyzer 140 may utilize a big data software framework, for example, the Apache Hadoop framework. The big data software framework such as the Apache Hadoop framework processes big data by distributing a task load. In the data collecting operation, different nodes of distributed computing structures are assigned to collect data from different resources. Also, when a data access of a specific node reaches a limit, a task is switched from the specific node to another node.

In one example, the data analysis apparatus 100 provides collected data analysis with respect to parameters and factors that affect the driving range estimation results. Accordingly, the data analysis apparatus 100 may accurately estimate the driving range of an EV based on attribute data that is data about operating environments and conditions. For example, the data analysis apparatus 100 may verify that a wind speed on a driving route has a significant effect on the driving range through the sensitivity analysis. In this example, if a region through which a vehicle is currently passing is verified as a windy area based on historical data, the data analysis apparatus 100 may decrease a data updating period, for example, by increasing a sampling rate, of wind direction data and wind speed data, and may apply the decreased data updating period, for example, the increased sampling rate, to the vehicle driving range estimation model.

In one example, the data analysis apparatus 100 further includes a determiner (not shown). The determiner is configured to determine whether attribute data is deterministic data that does not vary as the vehicle is driven. The deterministic data is data associated with a non-updating phenomenon, that is, data that does not change as the vehicle is driven. For example, the deterministic data may include any one or any combination of any two or more of a drag coefficient of a vehicle, a front area of the vehicle, and battery charge data.

When the collected attribute data is deterministic data that does not vary as the vehicle is driven, the mere fact that the attribute data is deterministic data affects the driving range of the vehicle, and thus the deterministic data transmitted to the correlation analyzer 120.

Also, among the collected attribute data, non-deterministic data that varies as the vehicle is driven, for example, weather, a driving behavior of a driver, and a traffic situation, is transmitted to a data classifier (not shown). For example, the non-deterministic data includes any one or any combination of any two or more of a speed of the vehicle, an acceleration of the vehicle, weather data, and a driving route.

In response to the attribute data being non-deterministic data, the data classifier classifies the attribute data into a predefined category based on statistical data. For example, a driver may be classified into a category, for example, a slow driver, a normal driver, and an aggressive driver, based on a driving style of the driver. As another example, weather data may be classified into a category, for example, a windy day, a calm day, a hot day, and a cold day. As another example, a route type may be classified into a category, for example, a local route, a highway route, and a boulevard route. In addition, a category may be classified based on objective criteria predetermined for non-deterministic data.

When classifying the non-deterministic data, the data classifier may utilize a big data software framework, for example, the Apache Hadoop framework.

Data classified into a predefined category based on statistical data is forwarded to the correlation analyzer 120 to generate the vehicle driving range estimation model based on a correlation between the driving range of the vehicle and the attribute data.

The correlation analyzer 120 generates the vehicle driving range estimation model by determining a correlation among the collected attribute data, the category, and the driving range of the vehicle. For example, the correlation analyzer 120 determines the correlation between the collected attributed data and the driving range of the vehicle using a cosine correlation. The correlation analyzer 120 uses deterministic data as a coefficient or a variable of the vehicle driving range estimation model. For example, deterministic data, such as a drag coefficient of a vehicle, a front area of the vehicle, and battery charge data, are used as the coefficient or the variable of the vehicle driving range estimation model. The correlation analyzer 120 applies an influence of non-deterministic data on the vehicle driving range estimation model. For example, in response to the attribute data being non-deterministic data, such as a speed of the vehicle, an acceleration of the vehicle, a wind speed, and a future route, the correlation between the driving range of the vehicle and the classified category is provided to a portion of the vehicle driving range estimation model.

Figure 2:
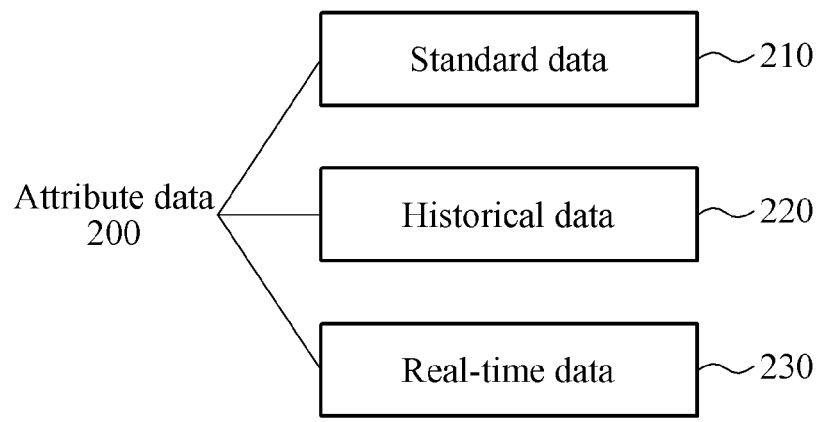
FIG. 2 is a diagram illustrating an example of attribute data.

FIG. 2 illustrates an example of attribute data.

Referring to FIG. 2, the attribute data 200 includes standard data 210, historical data 220, and real-time data 230.

The standard data 210 is data associated with a non-updating phenomenon, that is, data that does not vary as the vehicle is driven. For example, the standard data 210 includes standard test data that provides a specification, for example, a capacity degradation, of the vehicle battery provided by the battery manufacturer, a standard driving route to a destination provided by a satellite navigation device, a climatic classification of the region in which the driving route is located at the current time provided Wikipedia or search portals, and the nominal driving range of the vehicle.

The historical data 220 is data related to a previous probabilistic behavior of a driver. For example, the historical data 220 includes the previous average energy consumption of the vehicle, a battery misuse history, such as operation under extreme temperatures, high humidity, high charging/discharging rate, deep cycles, that may have a last effect on the performance of the battery stored in a vehicle computer, and a recent traffic pattern of the driving route at the current time.

The real-time data 230 is data associated with current driving data and stochastic data that is to be updated in real time. For example, the real-time data 230 may include a traffic jam due to an accident, abrupt rainfall during driving, and a detour due to a closed road.

Currently, a large amount of data is available for the accurate driving range estimation of an EV. Such data may be collected from, for example, a battery charge data measurement apparatus, a battery manufacturer, a vehicle manufacturer, a driving behavior of a driver, a satellite navigation device such as a GPS, a traffic report, and a weather website. However, when performing the precise driving range estimation, some types of the attribute data have a greater effect on the estimated driving range compared to other types of the attribute data. The attribute data may be classified into the standard data 210, the historical data 220, and the real-time data 230.

Figure 3:
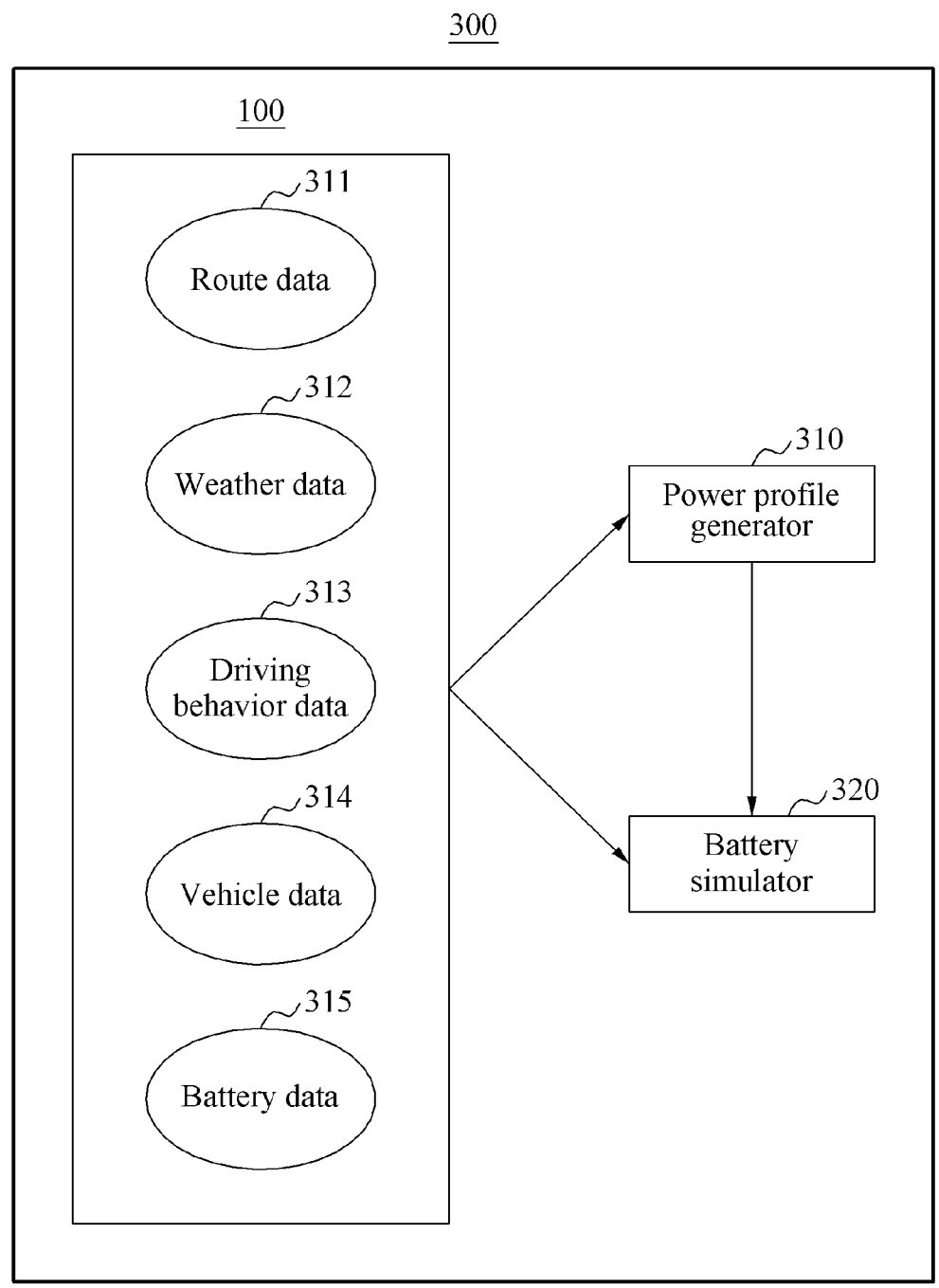
FIG. 3 is a diagram illustrating an example of a battery charge data estimation apparatus.

FIG. 3 illustrates an example of a battery charge data estimation apparatus.

Referring to FIG. 3, the battery charge data estimation apparatus 300 includes the data analysis apparatus 100, a power profile generator 310, and a battery simulator 320.

The data analysis apparatus 100 collects any one or any combination of any two or more of route data 311, weather data 312, driving behavior data 313, vehicle data 314, and battery data 315.

The route data 311 may include a road state, longitude, latitude, and a road grade on a driving route input by a user from a departure to a destination. The weather data 312 may include information regarding whether it is raining or snowing, an amount of rain or snow, a temperature, a humidity, a wind direction, and a wind speed. The driving behavior data 313 may include a driving behavior such as sudden acceleration and sudden stop by a driver, a speed on the driving route, and an acceleration profile. The vehicle data 314 may include a drag coefficient of the vehicle, a front area of the vehicle, and an energy consumption rate. The battery data 315 may include a battery capacity, battery charge data, and a battery output.

The data analysis apparatus 100 includes five collection nodes configured to collect the route data 311, the weather data 312, the driving behavior data 313, the vehicle data 314, and the battery data 315. The collection nodes collect attribute data related to the driving rate estimation from a variety of resources.

The battery charge data estimation apparatus 300 includes the power profile generator 310 configured to generate a power profile of the vehicle corresponding to route data using a vehicle driving range estimation model.

The battery charge data estimation apparatus 300 includes the battery simulator 320 configured to estimate remaining battery charge data by applying the power profile to a battery model of the vehicle.

The data analysis apparatus 100 transmits the route data 311, the weather data 312, the driving behavior data 313, and the vehicle data 314 to the power profile generator 310, and transmits the battery data 315 to the battery simulator 320.

The power profile generator 310 generates the power profile of the vehicle corresponding to route data using the vehicle driving range estimation model. For example, the power profile of the vehicle includes a speed and acceleration profile of the vehicle and an elevation profile. The power profile of the vehicle is input to the battery simulator 320. The speed and acceleration profile of the vehicle and the elevation profile will be further described with reference to FIG. 4.

The battery simulator 320 applies the power profile to the battery model of the vehicle. The battery simulator 320 inputs he battery data 315 forwarded from the data analysis apparatus 100 to the power profile. The battery simulator 320 generates an vehicle driving range estimation model based on the collected data.

The battery charge data estimation apparatus 300 estimates remaining battery charge data using the power profile. The driving range of the vehicle may be estimated based on a correlation between a traveled distance and an amount of charge used.

Figure 4:
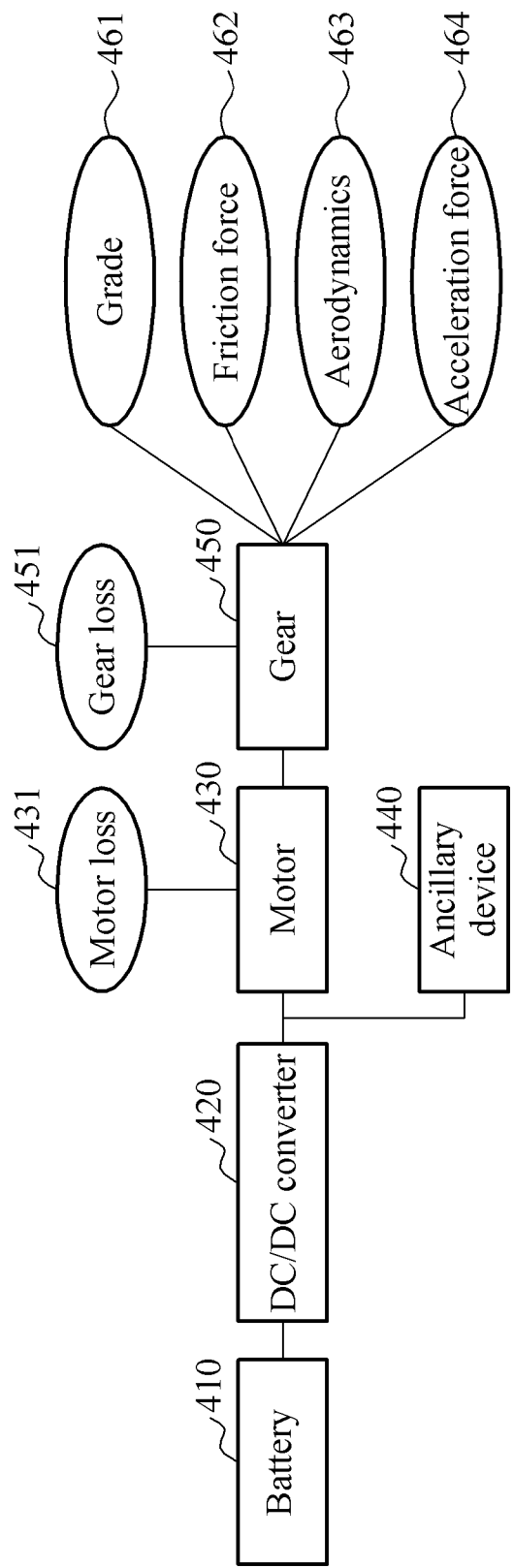
FIG. 4 is a block diagram illustrating an example of distributing energy produced at a battery to an electric vehicle (EV).

FIG. 4 illustrates an example of distributing energy produced at a battery to an EV.

Referring to FIG. 4, power of a battery 410 is provided to a motor 430 and an ancillary device 440 through a direct current-to-direct current (DC/DC) converter 420. Power produced at the motor 430 is drives a gear 450 and is used as a driving force of a vehicle.

The DC/DC converter 420 converts a voltage of the battery 410 to a voltage available at the vehicle. The DC/DC converter 420 is an electronic circuit device configured to convert DC power to DC power of another voltage. The power converted at the DC/DC converter 420 is provided to the motor 430 and the ancillary device 440. That is, the total power supplied from the battery 410 is expressed as a sum of power input to the motor 430 and power input to the ancillary device 440 as shown in Equation 1 below.

$$P_{Battery} = P_{Motor} + P_{Anc} \quad (1)$$

In Equation 1, $P_{Battery}$ denotes the total power supplied from the battery 410, $P_{Motor}$ denotes the power supplied to the motor 430, and $P_{Anc}$ denotes the power supplied to the ancillary device 440.

The ancillary device 440 may include, for example, an air conditioning device, a lighting device, an instruction device, and a variety of electronic equipment.

The motor 430 and the gear 450 convert electric power to power for driving the vehicle. A motor loss energy 431 and a gear loss energy 451 may be accounted for. A power $P_{Traction}$ for driving the EV is expressed as shown in Equation 2 below.

$$P_{Traction} = \frac{F_{Traction} \times v}{\eta_g} = P_{Motor} \times \eta_m \quad (2)$$

In Equation 2, a power $P_{Traction}$ required for driving the EV is a value obtained by dividing a product of a traction force $F_{Traction}$ and a speed v of the vehicle by a gear system efficiency $\eta_g$, and is equal to a product of the power $P_{Motor}$ that is input to the motor 430 and a motor efficiency $\eta_m$.

In one example, the energy produced at the gear 450, less the gear loss 451, is used as energy to overcome a grade 461, a friction force 462, aerodynamics 463, and an acceleration force 464.

The acceleration force 464 is expressed as shown in Equation 3 below.

$$F_{accel} = F_{la} + F_{wa} = ma + I \frac{G^2}{\eta_g r^2} a \quad (3)$$

In Equation 3, $F_{accel}$ denotes the acceleration force, and is equal to a sum of a linear acceleration force $F_{la}$ and a rotational acceleration force $F_{wa}$. In addition, m denotes mass, a denotes acceleration, I denotes a moment of inertia of a rotor, G denotes a gear ratio of a system that connects the rotor and a wheel, $\eta_g$ denotes a gear system efficiency, and r denotes a radius of the wheel.

Accordingly, among the power produced at the gear 450, the power used for acceleration is expressed as shown in Equation 4 below.

$$P_{accel} = \frac{F_{accel} \times v}{\eta_m \eta_g} \quad (4)$$

Elevation data at each point is collected from a map web service based on latitude and longitude coordinates of points on the extracted route. An elevation profile is generated based on the elevation data. The elevation profile is used to calculate a grade a at each point. An elevation force $F_{elev}$ and a friction force $F_{friction}$ of the EV are calculated based on road grade data as respectively shown in Equations 5 and 6 below.

$$F_{elev} = mg \times \sin a \quad (5)$$

$$F_{friction} = \mu_{rr} mg \times \cos a \quad (6)$$

In Equations 5 and 6, g denotes acceleration due to gravity and $\mu_{rr}$ denotes a rolling resistance coefficient of the vehicle.

Accordingly, among the energy produced at the gear 450, the power used to overcome the grade and the power used to overcome friction force are expressed as respectively shown in Equations 7 and 8 below.

$$P_{elev} = \frac{F_{elev} \times v}{\eta_m \eta_g} \quad (7)$$

$$P_{friction} = \frac{F_{friction} \times v}{\eta_m \eta_g} \quad (8)$$

Wind direction data, wind speed data, and temperature data of each point on the driving route are collected from a weather website based on latitude and longitude coordinates of points on the driving route. The collected wind speed data and wind direction data are used to calculate the aerodynamics 463 as shown in Equation 9 below.

$$F_{aerodynamic} = \frac{1}{2}\rho A C_d v^2 \quad (9)$$

In Equation 9, $\rho$ denotes an air density, A denotes a front area of the vehicle, and $C_d$ denotes a drag coefficient of the vehicle.

Among the power input to the motor 430, the power used to overcome the aerodynamics 463 is expressed as shown in Equation 10 below.

$$P_{aerodynamic} = \frac{F_{aerodynamic} \times v}{\eta_m \eta_g} \quad (10)$$

The power $P_{Motor}$ produced at the motor 430 is expressed as a sum of powers as shown in Equation 11 below.

$$P_{Motor} = P_{accel} + P_{elev} + P_{friction} + P_{aerodynamic} \quad (11)$$

Figure 5:
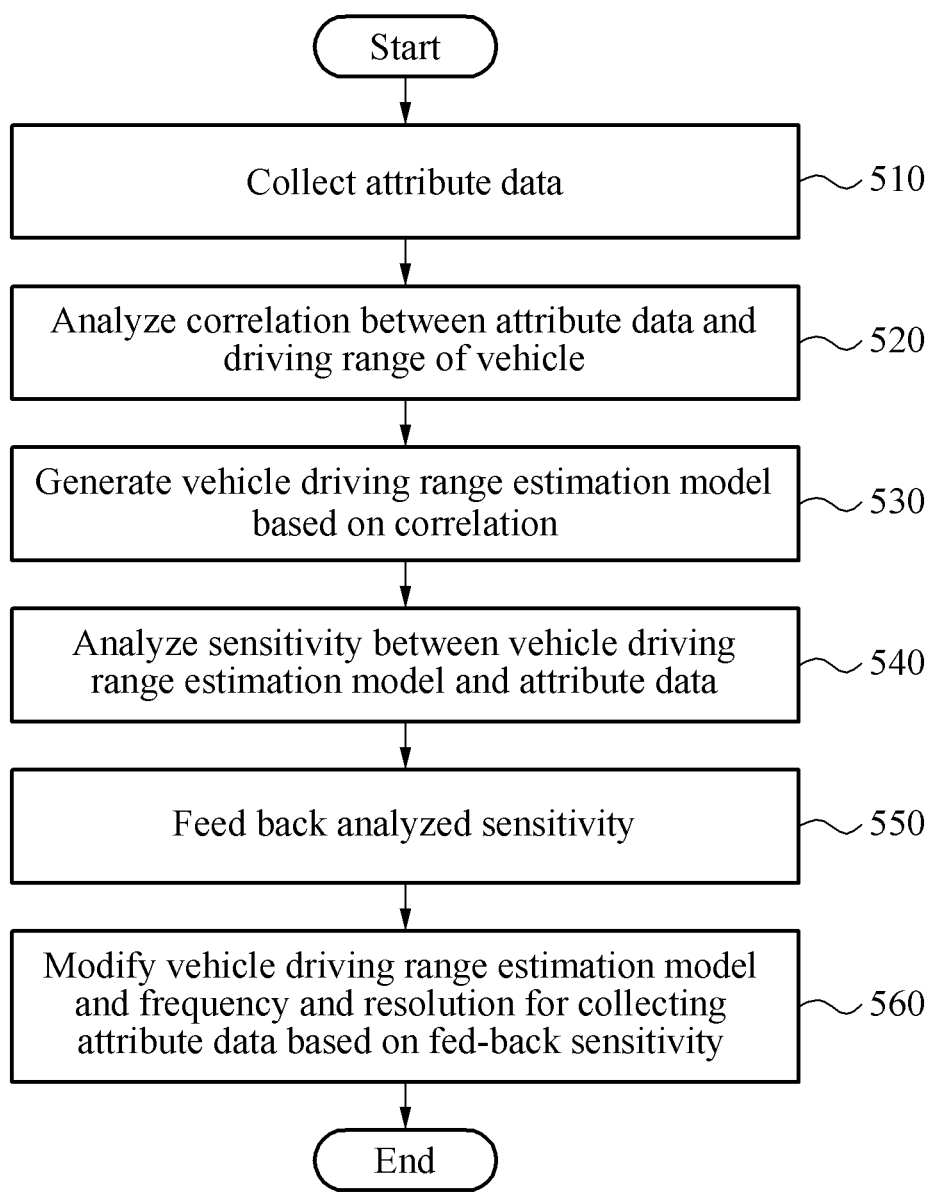
FIG. 5 is a flowchart illustrating an example of a method of analyzing data related to a driving range estimation of a vehicle.

FIG. 5 illustrates an example of a method (hereinafter, a data analysis method) of analyzing data related to a driving range estimation of a vehicle.

A driving range of the vehicle is estimated based on standard data, historical data, and real-time data. In general, an initial estimated value of the driving range is calculated based on the standard data and the historical data. An estimated value of the driving range is updated based on the real-time data during driving of the vehicle. In a specific situation, the driving range estimation of the vehicle may be relatively sensitive to specific data compared to other data. The specific data may be any one or any combination of any two or more of standard data, historical data, and real-time data based on circumstances. Attribute data related to the driving range estimation of an EV and a correlation between the driving range of the vehicle and the attribute data may be discovered using big data analytics. Big data is data generated in a digital environment and is large scale data that includes text data and image data as well as numerical data.

Referring to FIG. 5, in operation 510, a data analysis apparatus collects attribute data. The attribute data includes data related to the driving range estimation of the vehicle.

In one example, the attribute data may include any one or any combination of any two or more of standard data that is deterministic data that does not vary as the vehicle is driven, historical data based on a previous probabilistic behavior of a driver, and real-time data related to current driving data of the vehicle.

For example, in operation 510, the data analysis apparatus collects topographical data through Google Maps. As another example, in operation 510, the data analysis apparatus collects weather data through a weather website. As another example, in operation 510, the data analysis apparatus collects EV data, for example, a fuel efficiency, a drag coefficient, and a front area, of the EV from an EV manufacturer. As another example, in operation 510, the data analysis apparatus collects battery data, for example, a battery capacity and a battery output, from a battery manufacturer.

In operation 520, the data analysis apparatus analyzes a correlation between the attribute data and the driving range of the vehicle.

The data analysis apparatus may determine the correlation between the collected data and the driving range of the vehicle using a cosine correlation. In operation 520, the data analysis apparatus uses deterministic data as a coefficient or a variable of a vehicle driving range estimation model. For example, deterministic data, such as a drag coefficient of the vehicle, a front area of the vehicle, and battery charge data, is used as the coefficient or the variable of the vehicle driving range estimation model.

In operation 530, the data analysis apparatus generates the vehicle driving range estimation model based on the correlation analyzed in operation 520.

In one example, the data analysis apparatus generates an initial vehicle driving range estimation model based on collected standard data and historical data. The data analysis apparatus updates the vehicle driving range estimation model by applying real-time data to the initial vehicle driving range estimation model.

In operation 530, the data analysis apparatus applies an influence of non-deterministic data on the vehicle driving range estimation model. For example, in response to the attribute data being non-deterministic data, such as a speed of the vehicle, an acceleration of the vehicle, a wind speed, and a future route, a correlation between the driving range of the vehicle and a classified category is provided to the vehicle driving range estimation model.

In operation 540, the data analysis apparatus analyzes a sensitivity between the vehicle driving range estimation model and the attribute data.

In one example, in operation 540, in response to the attribute data being insufficient for the vehicle driving range estimation model, the data analysis apparatus calculates an estimation error occurring in estimating the driving range of the vehicle.

In operation 550, the data analysis apparatus feeds back the analyzed sensitivity.

In operation 560, the data analysis apparatus modifies the correlation between the driving range and each of standard data, historical data, and real-time data analyzed in operation 520 based on the fed-back sensitivity, and modifies the vehicle driving range estimation model generated in operation 530 based on the modified correlation, thereby modifying the vehicle driving range estimation model based on the fed-back sensitivity. Also, in operation 560 the data analysis apparatus adjusts a frequency and a resolution for collecting attribute data used in operation 510 based on the fed-back sensitivity.

In one example, the data analysis method further includes generating a power profile of the vehicle corresponding to route data using the vehicle driving range estimation model.

Also, the data analysis method may further include estimating remaining battery charge data by applying the power profile to a battery model of the vehicle.

Figure 6:
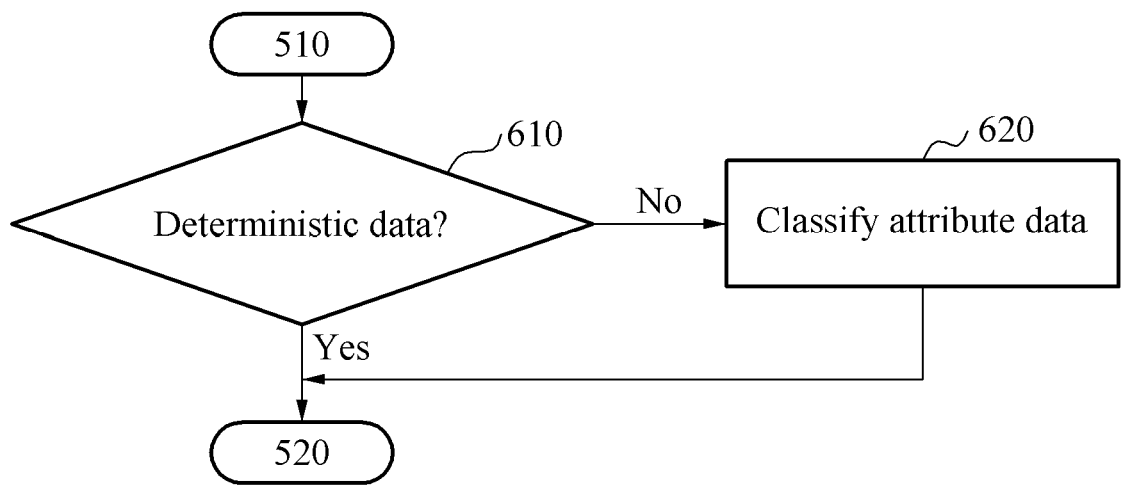
FIG. 6 is a flowchart illustrating an example of classifying data in the data analysis method of FIG. 5.

FIG. 6 illustrates an example of classifying data in the data analysis method of FIG. 5.

Referring to FIG. 6, in operation 610, the data analysis apparatus determines whether the collected attribute data is deterministic data.

Also, the data analysis apparatus may determine whether the collected attribute data is deterministic data. For example, the deterministic data may include any one or any combination of any two or more of a drag coefficient of the vehicle, a front area of the vehicle, and battery charge data. The non-deterministic data may include any one or any combination of any two or more of a speed of the vehicle, an acceleration of the vehicle, weather data, and a driving route.

In operation 620, when the collected attribute data, for example, historical data and real-time data, is determined as non-deterministic data, the data analysis apparatus classifies the collected attribute data into a predefined category based on statistical data. For example, a driver may be classified into a category, for example, a slow driver, a normal driver, and an aggressive driver, based on a driving style of the driver. As another example, weather data may be classified into a category, for example, a windy day, a calm day, a hot day, and a cold day. As another example, a route type may be classified into a category, for example, a local route, a highway route, and a boulevard route. In addition, a category may be classified based on objective criteria predetermined for non-deterministic data.

Also, in operation 620, in response to the collected attribute data being non-deterministic data that varies as the vehicle is driven, the data analysis apparatus classifies the attribute data into the predefined category based on the statistical data. Operation 620 may include analyzing a correlation between the classified category and the vehicle driving range.

The data analysis apparatus 100, the data collector 110, the correlation analyzer 120, the model generator 130, and the sensitivity analyzer 140 in FIG. 1, and the battery charge data estimation apparatus 300, the data analysis apparatus 100, the power profile generator 310, and the battery simulator 320 in FIG. 3 that perform the operations described herein with respect to FIGS. 1-6 are implemented by hardware components and may be embedded in a battery management system of an EV. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-6. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5 and 6 that perform the operations described herein with respect to FIGS. 1-6 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of analyzing data related to a driving range estimation of a vehicle, the method comprising:
   collecting attribute data related to the driving range estimation of the vehicle;
   analyzing a correlation between the attribute data and a driving range of the vehicle; and
   generating a vehicle driving range estimation model based on the analyzed correlation,
   wherein the analyzing of the correlation comprises:
      classifying the attribute data into a predefined category based on statistical data in response to the attribute data being non-deterministic data that varies as the vehicle is driven; and
      analyzing a correlation between the category and the driving range of the vehicle, and
   wherein the correlation between the category and the driving range of the vehicle is provided to the vehicle driving range estimation model.

2. The method of claim 1, wherein the attribute data comprises at least one of standard data that is deterministic data that does not vary as the vehicle is driven, historical data based on a previous probabilistic behavior of a driver, and real-time data related to current driving data of the vehicle.

3. The method of claim 1, further comprising analyzing a sensitivity between the vehicle driving range estimation model and the attribute data and feeding back the analyzed sensitivity,
   wherein the collecting of the attribute data comprises adjusting a frequency and a resolution for collecting the attribute data based on the fed-back sensitivity.

4. The method of claim 3, wherein the generating of the vehicle driving range estimation model comprises modifying the vehicle driving range estimation model based on the fed-back sensitivity.

5. The method of claim 1, wherein the generating of the vehicle driving range estimation model comprises:
   generating the vehicle driving range estimation model by applying deterministic data that does not vary as the vehicle is driven as a coefficient of the vehicle driving range estimation model; and
   applying an influence of non-deterministic data on the vehicle driving range estimation model, the non-deterministic data varying as the vehicle is driven.

6. The method of claim 5, wherein the deterministic data comprises at least one of a drag coefficient of the vehicle, a front area of the vehicle, and battery charge data.

7. The method of claim 5, wherein the non-deterministic data comprises at least one of a speed of the vehicle, an acceleration of the vehicle, weather data, and a driving route.

8. The method of claim 1, further comprising analyzing a sensitivity between the vehicle driving range estimation model and the attribute data,
   wherein the analyzing of the sensitivity comprises calculating an estimation error occurring in estimating the driving range of the vehicle in response to the attribute data being insufficient for the vehicle driving range estimation model.

9. The method of claim 1, further comprising generating a power profile of the vehicle corresponding to route data using the vehicle driving range estimation model.

10. The method of claim 9, further comprising estimating remaining battery charge data by applying the power profile to a battery model of the vehicle.

11. The method of claim 1, wherein the analyzing of the correlation further comprises analyzing a correlation between standard data, which is manufacturer data of the vehicle or a driving route, and the driving range of the vehicle.

12. The method of claim 1, wherein the attribute data comprises historical data of the vehicle and real-time data of the vehicle.

13. The method of claim 12, wherein the historical data comprises battery misuse history comprising at least one of extreme temperature operation, high humidity operation, high charging or discharging rate operation, or deep cycles operation.

14. An apparatus for analyzing data related to a driving range estimation of a vehicle, the apparatus comprising:
   a data collector configured to collect attribute data related to the driving range estimation of the vehicle;
   a correlation analyzer configured to analyze a correlation between the attribute data and a driving range of the vehicle, to classify the attribute data into a predefined category based on statistical data in response to the attribute data being non-deterministic data that varies as the vehicle is driven, and to analyze a correlation between the category and the driving range of the vehicle; and
   a model generator configured to generate a vehicle driving range estimation model based on the analyzed correlation,
   wherein the correlation between the category and the driving range of the vehicle is provided to the vehicle driving range estimation model.

15. The apparatus of claim 14, wherein the attribute data comprises at least one of standard data that is deterministic data that does not vary as the vehicle is driven, historical data based on a previous probabilistic behavior of a driver, and real-time data related to current driving data of the vehicle.

16. The apparatus of claim 14, further comprising a sensitivity analyzer configured to analyze a sensitivity between the vehicle driving range estimation model and the attribute data,
   wherein the sensitivity analyzer is further configured to feed back the analyzed sensitivity; and
   the data collector is further configured to adjust a frequency and a resolution for collecting the attribute data based on the fed-back sensitivity.

17. The apparatus of claim 16, wherein the model generator is further configured to modify the vehicle driving range estimation model based on the fed-back sensitivity.

18. The apparatus of claim 14, wherein the model generator is further configured to generate the vehicle driving range estimation model by applying deterministic data that does not vary as the vehicle is driven as a coefficient of the vehicle driving range estimation model, and apply an influence of non-deterministic data on the vehicle driving range estimation model, the non-deterministic data varying as the vehicle is driven.

19. The apparatus of claim 14, further comprising a sensitivity analyzer configured to analyze a sensitivity between the vehicle driving range estimation model and the attribute data,
wherein the sensitivity analyzer is further configured to calculate an estimation error occurring in estimating the driving range of the vehicle in response to the attribute data being insufficient for the vehicle driving range estimation model.

20. The apparatus of claim 14, further comprising a power profile generator configured to generate a power profile of the vehicle corresponding to route data using the vehicle driving range estimation model.

21. The apparatus of claim 20, further comprising a battery simulator configured to estimate remaining battery charge data by applying the power profile to a battery model of the vehicle.

22. An apparatus for estimating a driving range of a vehicle, the apparatus comprising:
a model generator configured to generate a vehicle driving range estimation model based on attribute data affecting the driving range of the vehicle;
a correlation analyzer configured to analyze a correlation between the attribute data and the driving range of the vehicle;
a sensitivity analyzer configured to analyze a sensitivity between the vehicle driving range estimation model and the attribute data, and modify the vehicle driving range estimation model based on the sensitivity; and
a battery simulator configured to estimate a remaining charge of a battery of the vehicle based on the vehicle driving range estimation model and the attribute data, the remaining charge being indicative of the driving range of the vehicle,
wherein the model generator is further configured to generate the vehicle driving range estimation model based on the analyzed correlation,
the correlation analyzer further configured to classify the attribute data into a predefined category based on statistical data in response to the attribute data being non-deterministic data that varies as the vehicle is driven and to analyze a correlation between the category and the driving range of the vehicle,
wherein the correlation between the category and the driving range of the vehicle is provided to the vehicle driving range estimation model.

23. The apparatus of claim 22, wherein the sensitivity analyzer is further configured to modify the vehicle driving range estimation model to have a relatively greater sensitivity to attribute data having a relatively greater effect on the driving range of the vehicle among all of the attribute data, and to have a relatively lesser sensitivity to attribute data have a relatively lesser effect on the driving range of the vehicle among all of the attribute data.

24. The apparatus of claim 22, further comprising a power profile generator configured to generate a power profile of the vehicle corresponding to a route over which the vehicle is being driven based on the vehicle driving range estimation model and the attribute data.

25. The apparatus of claim 24, wherein the attribute data comprises battery data of the battery; and
the battery simulator is further configured to estimate the remaining charge of the battery based on the power profile, the battery data, and a battery model of the battery.

* * * * *